United States Patent [15] 3,645,196
Johnston et al. [45] Feb. 29, 1972

[54] FRENCH FRYING MACHINE HAVING ROTARY FOOD-CONVEYING DRUM

[72] Inventors: William D. Johnston; William J. Long, both of Franklin County, Ohio

[73] Assignee: White Castle System, Inc., Columbus, Ohio

[22] Filed: Mar. 9, 1970

[21] Appl. No.: 17,576

[52] U.S. Cl. ................................................99/404, 99/407
[51] Int. Cl. ..............................................................A47j 37/12
[58] Field of Search...................99/404, 403, 405, 406, 407, 99/408, 443

[56] References Cited

UNITED STATES PATENTS 3,474,726 10/1969 Curtin......................................99/404
3,274,920 9/1966 Benson....................................99/404
2,773,442 12/1956 Contreras............................99/407 X

FOREIGN PATENTS OR APPLICATIONS 895,571 5/1962 Great Britain............................99/404
299,596 11/1928 Great Britain............................99/404
485,307 5/1938 Great Britain............................99/404

Primary Examiner—Edward L. Roberts
Assistant Examiner—Arthur O. Henderson
Attorney—William S. Rambo

[57] ABSTRACT

A French frying machine in which a generally horizontally disposed, axially rotatable drum is employed to convey batches of food to, through, and from a vat or well of hot cooking oil, the food-conveying drum having a plurality of circumferentially adjoining, but separate, food-receiving pockets or compartments so constructed as to automatically discharge the cooked food therefrom by gravity as it leaves the cooking oil.

2 Claims, 9 Drawing Figures

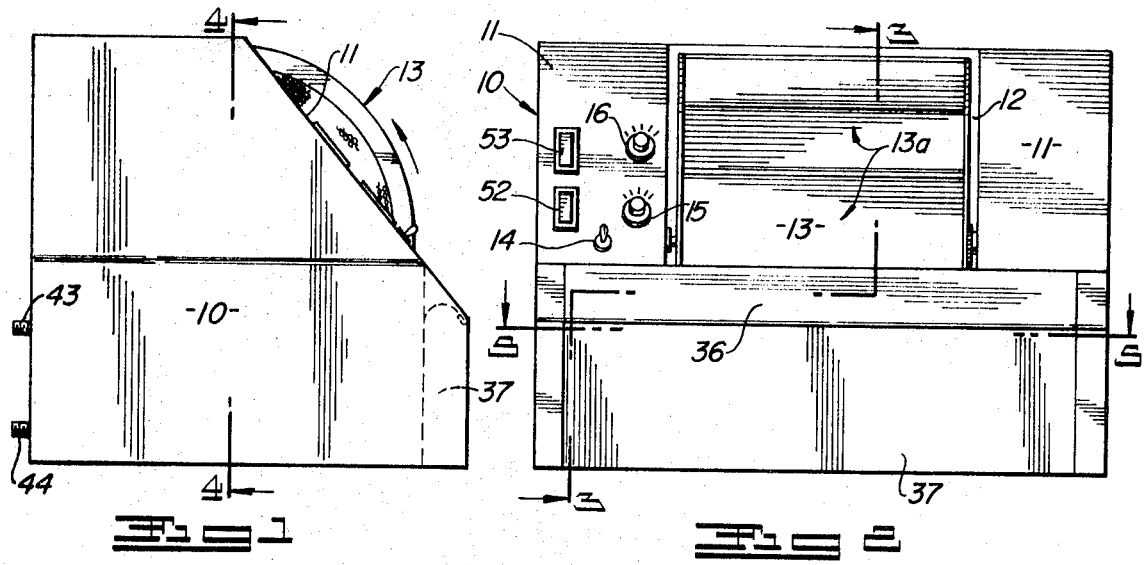
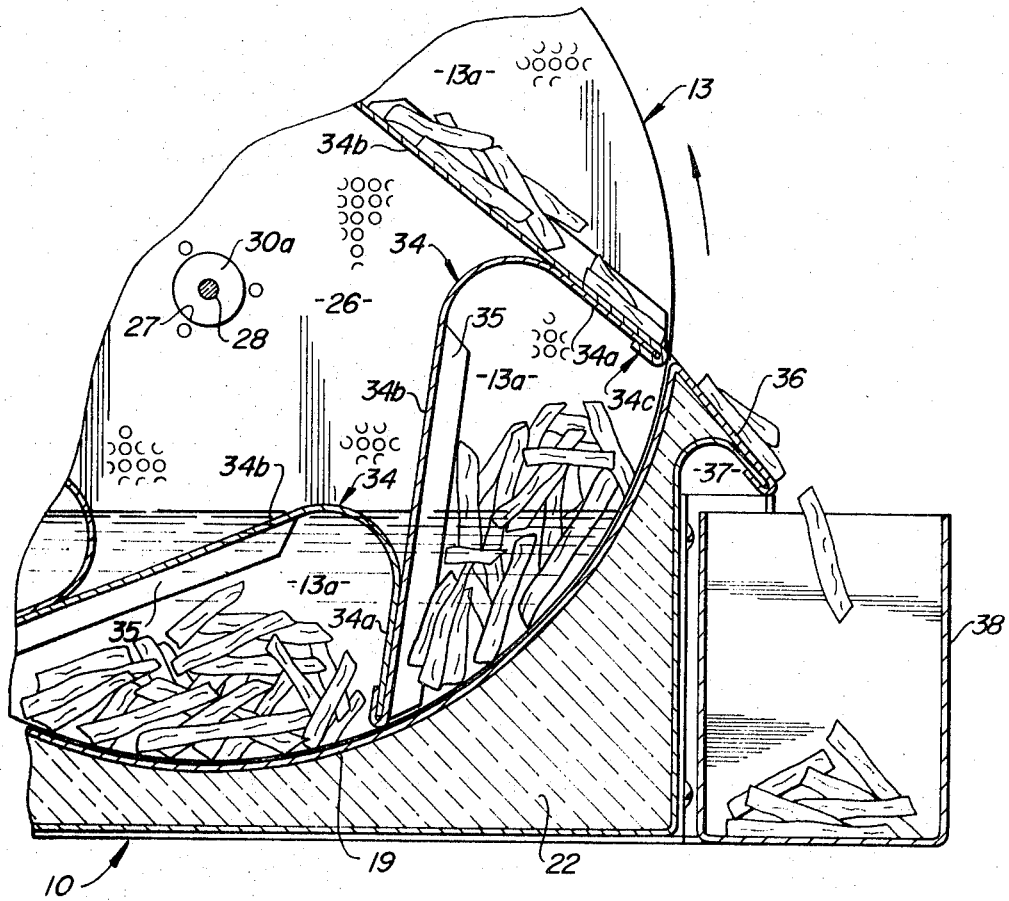

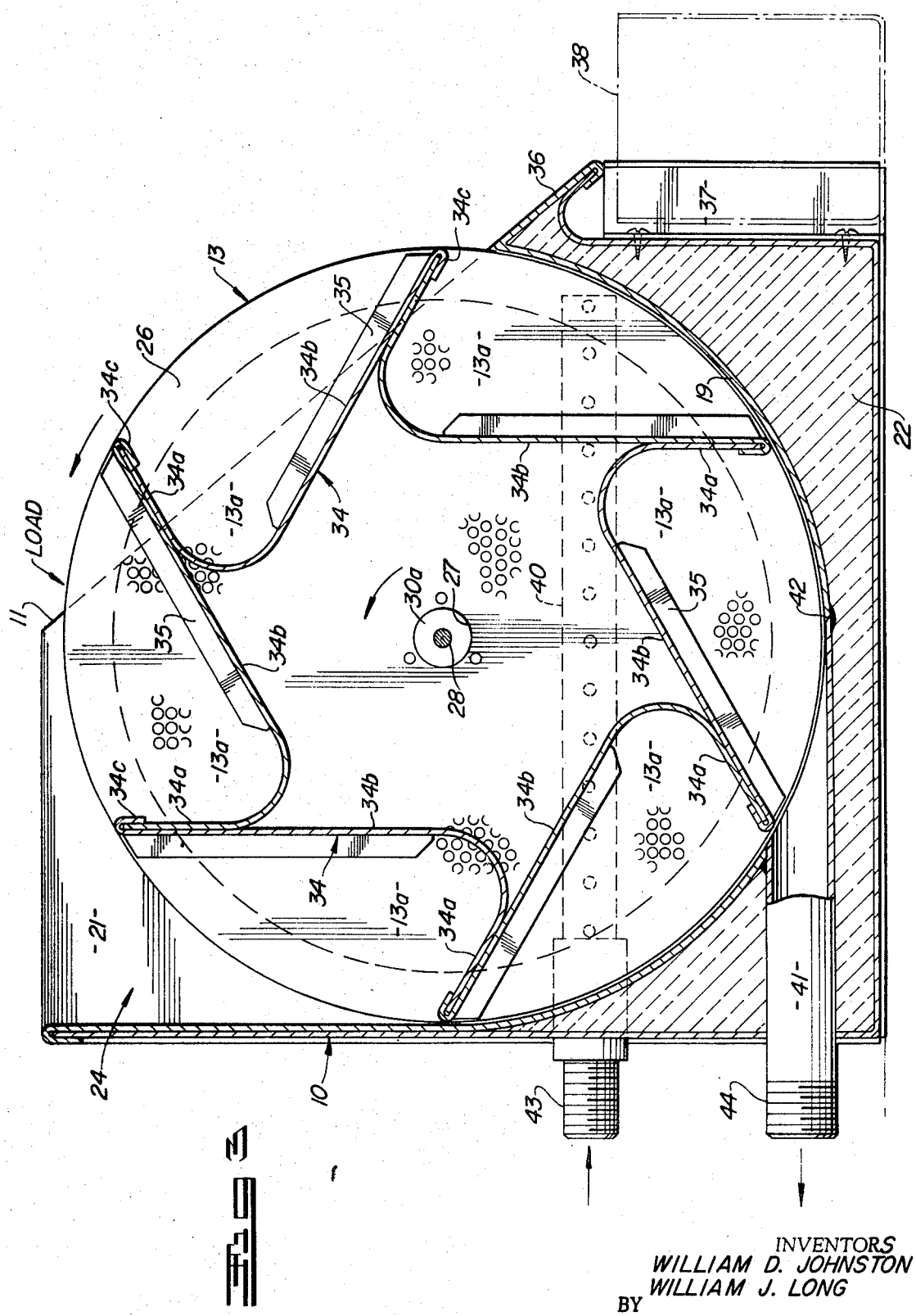

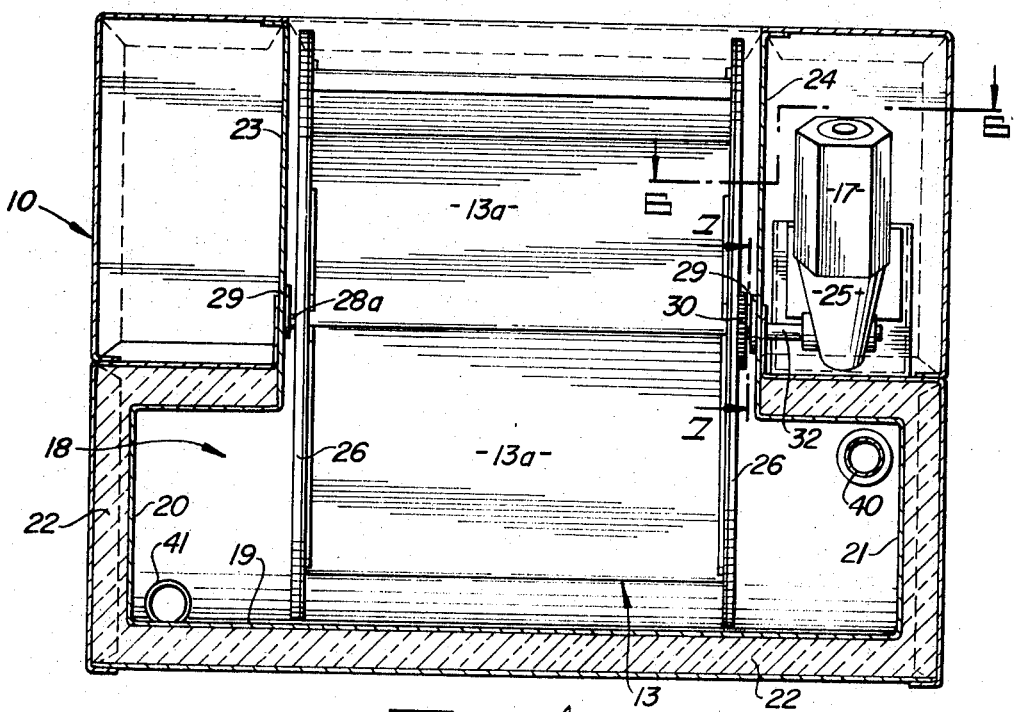
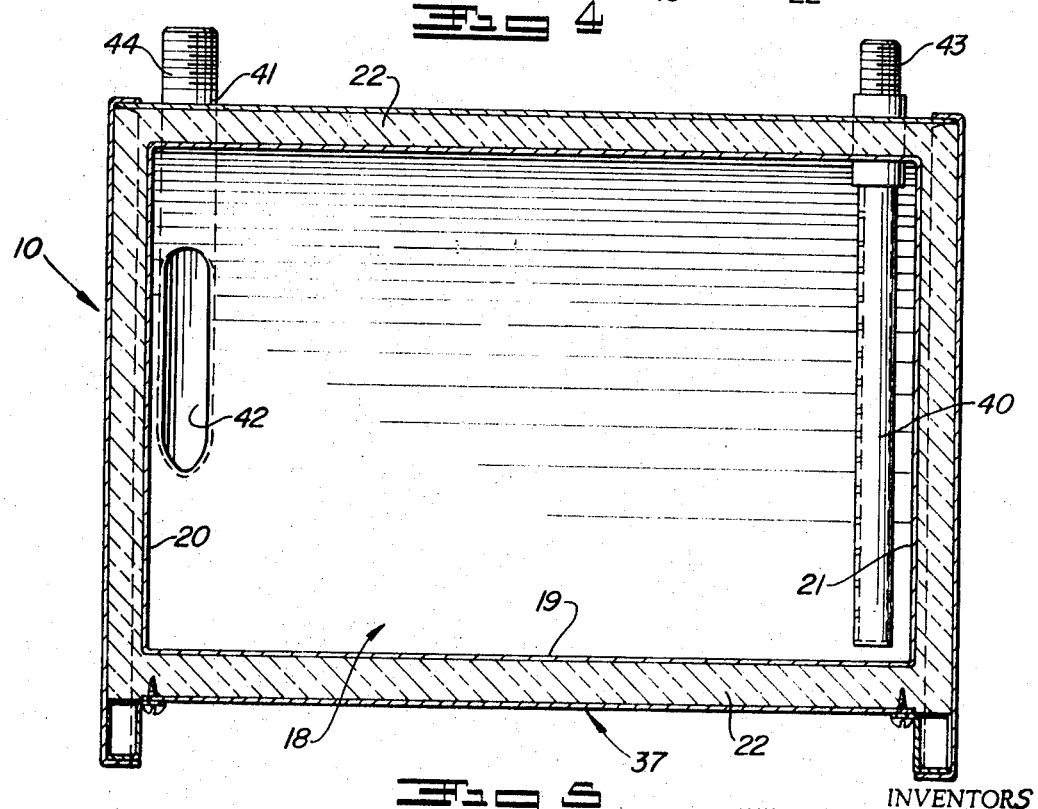

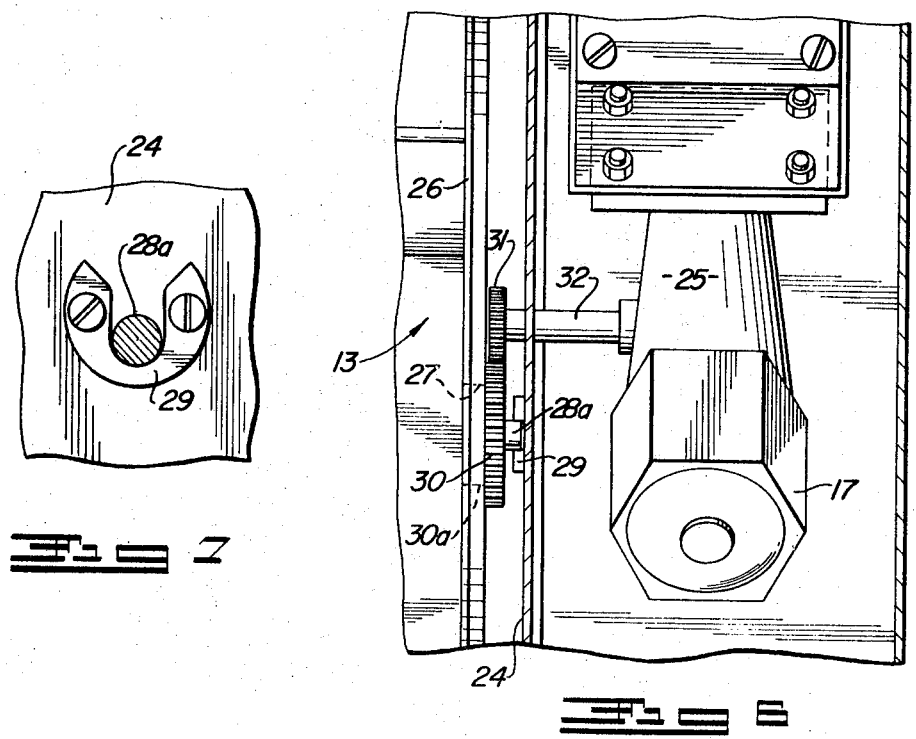
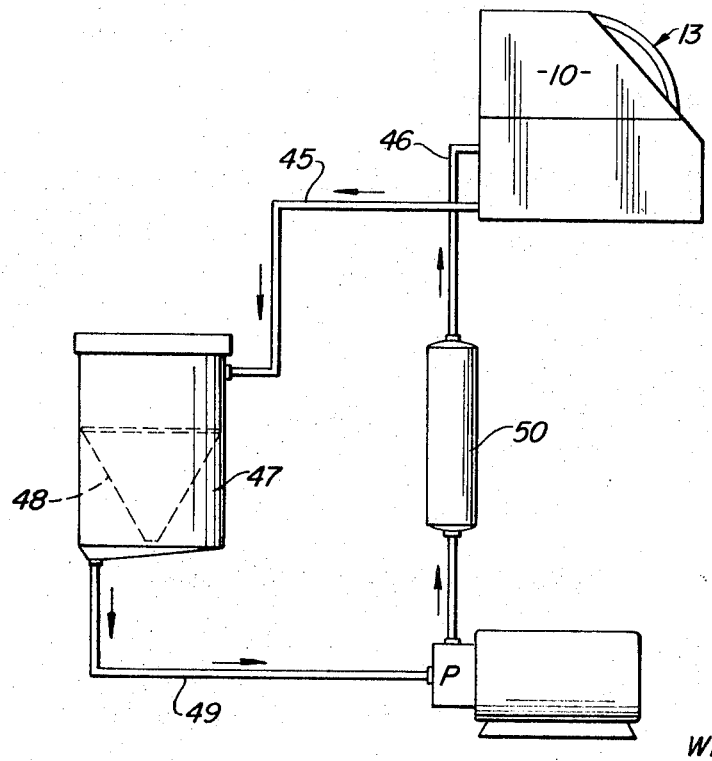

FRENCH FRYING MACHINE HAVING ROTARY FOOD-CONVEYING DRUM

BACKGROUND OF THE INVENTION

This invention relates generally to food-cooking apparatus, and more particularly to an improved French frying machine for short order restaurants or similar establishments engaged in high-capacity French frying operations.

In the past, restaurants have generally employed one or more French frying machines which consisted primarily of a gas-fired or electrically heated vat of cooking oil into which might be placed one or more wire mesh baskets containing the food to be cooked. These so-called tank or open vat-type French frying machines were subject to numerous objections, such as the fire hazard created by the open tank or vat of cooking oil, the susceptibility of scalding of personnel attending such machines, and the lack of uniformity of cooking occasioned by variations in temperature of the cooking oil, and the time interval of immersion of the food within the cooking oil.

While various types of so-called automatic French frying machines embodying ferris wheel-type food-conveying devices have been heretofore proposed for the French frying of various food products, such as Taco shells, etc., by and large, such prior art French frying machines are limited to the cooking of only certain types of food products and generally embody relatively complex food-handling mechanisms for loading and unloading food on to and from the ferris wheel-type-conveying means. Typical prior art French frying machines of this type are disclosed in U.S. Pats. No. 2,773,442 issued Dec. 11, 1956 to Contreas and U.S. Pat. No. 3,274,920 issued Sept. 27, 1966 to Benson.

SUMMARY AND OBJECTS OF THE INVENTION

This invention provides a cabinet or console type of automatic French frying machine which includes a cooking well or vat defined in part by a concave, semicircular bottom wall, a pump-operated oil recirculating, heating and filtering system which functions to maintain a body of properly heated, filtered cooking oil within the cooking well of the machine at all times, and a rotary, food-conveying drum removably supported for axial rotation within the cabinet, and having a lower cylindrical segment normally disposed within the cooking well. The food-conveying drum is also provided with a plurality of food-receiving pockets into which pieces of uncooked food may be placed for traverse through the cooking well and which are so arranged as to automatically discharge cooked pieces of food from the drum immediately following passage thereof through the cooking well.

The primary object of the present invention is to provide an efficient automatic French frying machine which is characterized by its versatility and adaptability to the French frying of different types of foods.

Another object of this invention is to provide a restaurant type of French frying machine in which the vat or well of cooking oil is normally covered and rendered inaccessible during cooking operations by the rotary food-conveying drum, thereby protecting the restaurant attendants and personnel against the hazards of an open vat or well of hot cooking oil.

IN THE ACCOMPANYING DRAWINGS

FIG. 1 is a side elevational view of a French frying machine according to the present invention;

FIG. 2 is a front elevational view of the machine;

FIG. 3 is a transverse vertical sectional view taken along the line 3—3 of FIG. 2 and illustrating particularly the construction and configuration of the food-receiving pockets or compartments of the food-conveying drum of the machine;

FIG. 4 is a longitudinal vertical sectional view taken along a plane indicated by the line 4—4 of FIG. 1;

FIG. 5 is a horizontal sectional view taken along a plane indicated by the line 5—5 of FIG. 2 and illustrating the cooking well of the machine with the drum removed therefrom;

FIG. 6 is an enlarged, detailed, horizontal sectional view taken along the lines 6—6 of FIG. 4, and illustrating the variable speed, electric motor drive for the rotary food-conveying drum;

FIG. 7 is a detailed vertical sectional view taken along the line 7—7 of FIG. 4 and illustrating one of the supporting brackets for the axle of the food-conveying drum;

FIG. 8 is an enlarged, fragmentary vertical sectional view taken through a portion of the food-conveying drum and illustrating the manner in which batches of food are conveyed through the cooking well and automatically discharged by gravity from the machine; and FIG. 9 is a diagram of the oil-filtering, heating and recirculating system of the present French frying machine.

DESCRIPTION OF PREFERRED EMBODIMENT

Referring now to the drawings, the present French frying machine comprises a console-type outer casing or cabinet 10 of a size to be conveniently positioned on a table or counter top, not shown, in the kitchen or cooking area of a restaurant. The outer casing 10 includes a diagonal front wall 11 which is formed with a central rectangular opening 12 through which projects an upper cylindrical segment of a generally horizontally disposed food-conveying drum 13. As seen in FIG. 2, the diagonally inclined front wall 11 of the casing includes, on the leftward side thereof, the various indicators and controls for the French frying machine. These controls include a toggle switch 14 which controls the electrical circuits for the heating elements and motors of the machine, a temperature control knob 15 which adjusts the setting of a thermostatic switch, not shown, so as to maintain a desired temperature in the body of cooking oil, and a speed control knob 16 which operates through a rheostat, not shown, to vary the speed of rotation of an electric motor 17 which drives the food-conveying drum 13, all as will be hereinafter more fully described.

As seen more particularly in FIGS. 4 and 5 of the drawings, the outer casing or cabinet 10 is formed with a cooking vat or well 18 which is defined by an arcuately curved, generally semicircular bottom wall 19, and a pair of longitudinally spaced, upstanding end walls 20 and 21. Preferably, the bottom wall 19 and end walls 20 and 21 which define the cooking vat or well are spaced from the corresponding outer walls of the cabinet or casing of the machine, and the spacing between such walls is filled with a suitable thermal insulating material 22.

The cabinet further includes a pair of internal, relatively spaced, vertical, compartment-forming walls 23 and 24 which are formed as continuations of the end walls 20 and 21, respectively. The compartment-forming walls 23 and 24 define the sidewalls of the drum-receiving opening 12, and also define with the outer walls of the cabinet 10 a pair of internal compartments to house the electrical controls and indicators, and the drum-driving motor 17 and its associated drive transmission 25.

The food-conveying drum 13 is formed by a pair of relatively spaced, circular end walls or plates 26. Each of the end walls or plates 26 of the drum is perforated in its central region to permit the flow of oil therethrough. Additionally, the end walls 26 of the drum are formed with central openings through which projects an axle shaft 28. The shaft 28 extends axially through the drum 13 and terminates in end extensions 28a which are demountably supported within a pair of opposed generally U-shaped cradle brackets 29 carried on the compartment-forming walls 23 and 24 of the cabinet structure. As shown more particularly in FIGS. 4 and 6, the right-hand end plate 26 of the drum has secured thereto a pinion gear 30 which is formed with a reduced diameter hub portion 30a positioned in a central opening 27 formed in the end plate. The gear 30 is arranged to mesh with a relatively smaller pinion gear 31 carried at the outer end of the output shaft 32 of the motor drive transmission 25. At the same time, the arrangement of the gears 30 and 31 is such as to permit the food-conveying drum to be removed bodily, vertically upwardly through the opening 12 of the cabinet. This is accomplished simply by grasping the opposite end walls 26 of the drum and lifting the axle shaft extensions 28a upwardly and out of the supporting cradles 29. Conversely, the entire drum may be remounted in the cradle brackets 29 simply by moving it downwardly through the opening 12 of the cabinet until the axle shaft extensions 28a are cradled within the brackets 29 and with the teeth of the gear 30 meshed with the teeth of the pinion 31. The removability of the food-conveying drum permits the same to be easily cleaned by immersion in a cleansing solution, and thereby greatly increases the sanitation of the machine.

The food conveying drum 13 also includes a plurality of longitudinally extending pocket-forming walls 34 which are generally U-shaped in transverse cross section, and which form a plurality of radially outwardly opening food-receiving pockets 13a at the outer circumferential surface of the drum. As shown particularly in FIGS. 3 and 8, each of the pocket-forming walls or webs 34 extends between the circular end walls 26 of the drum, and is secured thereto by means of vertically arranged end flanges 35 which are spot welded or otherwise rigidly secured to the adjoining inner side surfaces of the end walls 26 of the drum. Each of the pocket-forming webs or walls 34 includes a pair of angularly related legs 34a and 34b, and the longer of these legs 34b is formed at its outer edge with an inwardly bent lip 34c which embraces the outer edge portion of the shorter leg 34a of an adjacent pocket-forming wall 34. In this manner, the drum 13 is rigidified, and is substantially devoid of open cracks or crevices which might otherwise tend to collect and trap food particles and cooking oil therein.

Also, it will be noted that each of the legs 34a and 34b of the pocket-forming walls 34 are disposed in nonradial relation to the axis of the drum, so that the food-receiving pockets 13a located along the upper segment of the drum are cupped downwardly so as to retain food received therein, whereas the pockets 13a located along the lower and front segments of the drum will tend to spill their contents onto the curved bottom wall 19 of the cooking well. Further, the longer leg 34b of each wall 34 is arranged so that as each pocket 13a emerges from the cooking well, the food particles carried therein will slide downwardly and outwardly from the leg 34b to be discharged by gravity over a downwardly inclined lip 36 formed along the front side of the cabinet 10 below the opening 12. Advantageously, the lower portion of the front wall of the cabinet is formed with an inset or recessed chamber 37 beneath the lip or tray 36 into which a generally rectangular food-collecting pan or vessel 38 may be positioned so as to receive and collect the cooked food discharged by gravity from the pockets 13a of the drum.

Extending through the back or rear wall of the cabinet 10 and into the upper right-hand region of the cooking well 18 is an inlet pipe or discharge nozzle 40 through which hot oil may be introduced to the cooking well 18. An outlet pipe or conduit 41 also communicates with the cooking well 18 substantially at the bottom and to the left-hand side thereof as viewed in FIGS. 4 and 5. Preferably, the outlet pipe 41 is formed at its inner end with a curvature corresponding to that of the bottom wall 19 of the well, and is welded within a corresponding oval-shaped opening 42 formed in the bottom wall 19. Each of the inlet and outlet conduits 40 and 41 are formed at their outer ends with screw-threaded nipples 43 and 44 which are connected with remotely extending, insulated pipes or conduits 45 and 46 which lead to and from a filtering, heating and recirculating system disposed in remote location to the cabinet of the French frying machine, as illustrated diagrammatically in FIG. 9. This system may include an oil-filtering tank or receptacle 47 containing a readily removable and disposable paper or fibrous filter element 48. The filter container 47 is provided with an outlet line or conduit 49 which connects with the inlet of a motor driven pump P. Connected with the outlet of the pump P is an in-line electrical heater or heat exchanger 50 whose outlet, in turn, is connected with the hot oil supply line 46 leading to the inlet pipe 40 of the machine.

Preferably, the motor driven pump P is energized at all times during operation of the French frying machine so as to continually circulate heated and filtered cooking oil through the cooking well 18. The heater 50 is preferably under the control of a suitable, adjustable thermostatic switch having a thermally-responsive element disposed in or closely adjacent to the cooking well 18, in order that the heater 50 may maintain the temperature of the cooking oil in the well 18 within a desired range. Toward this end, the temperature control knob 15 is provided so that the thermostatic switch, not shown, may be adjusted to establish and maintain a desired temperature in the cooking oil. A temperature indicator gauge 52 may also be provided on the front wall of the cabinet to visually indicate the actual temperature of the oil within the cooking well 18. Additionally, an oil level-indicating gauge 53 may be provided on the front wall of the cabinet to indicate to the attendant of the machine the level of oil in the cooking well 18.

As previously indicated, the control knob 16 is provided for the purpose of varying the speed of rotation of the drum 13, and thereby the time of cooking of the food deposited in the pockets 13a of the drum. As will be readily understood, the control knob 16 may be utilized to adjust a variable resistance rheostat, not shown, which may be electrically connected in series with the variable speed motor 17 employed to drive the drum in rotation. Thus, when it is desired to utilize the machine to cook comparatively large or thick pieces of food, say for example, chicken legs, the control knob will be set to produce a comparatively slow speed or rotation of the food-conveying drum 13. Conversely, when cooking relatively smaller size food particles, such as shoe string potatoes, the control knob may be set for a higher speed of rotation of the drum and a consequently reduced cooking time for the smaller food pieces.

To operate the present French frying machine, the attendant or cook, simply moves the toggle switch to the "on" position. This energizes the motor for the pump P and the drum drive motor 17 and establishes an operating circuit for the electrical heater 50. The control knobs 15 and 16 may then be adjusted to set the desired cooking temperature and the desired cooking time, respectively. When the temperature of the cooking oil in the well 18, as indicated by the gauge 52, reaches the desired cooking temperature, a batch of the uncooked food pieces or particles, such as raw sliced potatoes, are deposited in one of the upwardly open food-receiving pockets 13a of the drum 13. In this regard, it will be understood that the drum is intended to rotate continuously, but at comparatively slow speeds, e.g., from 0.1 to 0.5 r.p.m. depending upon the setting of the speed control knob 16. As the drum rotates, the batch of uncooked food is conveyed in a counterclockwise direction (FIG. 3) in the pocket 13a of the drum in which it is positioned and is traversed through the body of hot oil contained in the cooking well 18 and thence is discharged from the pocket of the drum by gravity as the pocket emerges from the cooking well and opens above the inclined lip or ledge 36 of the cabinet. Preferably, the cooked food-collecting container 38 is positioned in the recessed chamber 37 of front wall of the cabinet so as to catch the cooked food particles discharged from the pockets 13a of the drum.

As will be seen in FIGS. 3 and 8, the pockets 13a become inverted as they enter the cooking well 18 of the machine and the pieces of food carried therein are deposited freely into the body of hot oil contained in the cooking well. At the same time, the moving pocket-forming walls 34 and end walls 26 of the drum are disposed in such closely spaced relation to the curved bottom wall 19 of the cooking well, that each batch of food particles is trapped and remains within its pocket 13a as the drum continues to rotate and until the pocket emerges from the cooking well and opens above the discharge lip 36 of the cabinet. It will be understood that substantially all of the food-receiving pockets 13a of the drum, except that which has been immediately discharged, may be utilized and filled with food particles during each revolution of the drum.

As will be apparent, the downwardly inclined disposition of the angularly related legs 34a and 34b of the pocket-forming walls 34 as they emerge from the cooking well 18 greatly facilitates the drainage of hot oil therefrom and the return of such oil to the cooking well.

In view of the foregoing, it will be seen that the present invention provides an improved, semiautomatic French-frying machine which is characterized by its versatility in being able to cook widely varying sizes and types of food particles or pieces, and its ease and safety of operation.

We claim:

1. In a French frying machine which includes a cabinet, an open top cooking well defined in part by an arcuate bottom wall, and means for circulating hot cooking oil through said well; that improvement which comprises a generally horizontally disposed, cylindrical, food-conveying drum removably supported in said cabinet for axial rotation and having a lower segment thereof positioned within said cooking well in closely spaced, concentric relation to the bottom wall of said well, said drum including a pair of axially spaced apart, circular and perforate end members connected by a plurality of axially extending, U-shaped walls disposed in nonradial relation to the axis of said drum and defining thereon a series of longitudinally extending, circumferentially spaced, outwardly opening pockets into which one or more pieces of food may be placed for rotational traverse through the cooking well of said machine, the pockets of said drum being so arranged as to cause food positioned therein to be discharged outwardly therefrom by gravity as said pockets clear the cooking well of said machine during rotation of said drum; and means in said machine detachably engaging said drum and for driving said drum in axial rotation.

2. A French-frying machine as defined in claim 1, wherein said drum-driving means comprises a variable speed, electric motor drive.

* * * * *